US012308159B2

(12) United States Patent
Wang et al.

(10) Patent No.: US 12,308,159 B2
(45) Date of Patent: May 20, 2025

(54) TRANSFORMER COOLING SYSTEM AND TRANSFORMER INSTALLATION

(71) Applicant: Hitachi Energy Ltd, Zürich (CH)

(72) Inventors: Yong Wang, Brilon (DE); Jens Tepper, Wolfenbüttel (DE); Wei Wu, Raleigh, NC (US); Ava-Ye Xu, Shanghai (CN)

(73) Assignee: Hitachi Energy Ltd, Zürich (CH)

( * ) Notice: Subject to any disclaimer, the term of this patent is extended or adjusted under 35 U.S.C. 154(b) by 975 days.

(21) Appl. No.: 17/297,690

(22) PCT Filed: Oct. 22, 2019

(86) PCT No.: PCT/EP2019/078672
§ 371 (c)(1),
(2) Date: May 27, 2021

(87) PCT Pub. No.: WO2020/108869
PCT Pub. Date: Jun. 4, 2020

(65) Prior Publication Data
US 2022/0037079 A1 Feb. 3, 2022

(30) Foreign Application Priority Data
Nov. 29, 2018 (EP) .................................... 18209331

(51) Int. Cl.
*H01F 27/20* (2006.01)
*H01F 27/28* (2006.01)

(52) U.S. Cl.
CPC ......... *H01F 27/2876* (2013.01); *H01F 27/20* (2013.01)

(58) Field of Classification Search
CPC .... H01F 27/2876; H01F 27/20; H01F 27/322; H01F 2027/329; H01F 27/025
(Continued)

(56) References Cited

U.S. PATENT DOCUMENTS 2,853,540 A 9/1958 Camilli et al.
2,942,213 A * 6/1960 Camilli .................. H01F 27/20 336/60
(Continued)

FOREIGN PATENT DOCUMENTS

CN 102165539 A 8/2011
DE 102017102436 A1 8/2018
(Continued)

OTHER PUBLICATIONS

Chinese Search Report, for Chinese Patent Application No. 2019800774893, Aug. 9, 2023, 3 pages.
(Continued)

*Primary Examiner* — Tuyen T Nguyen
(74) *Attorney, Agent, or Firm* — Sage Patent Group

(57) ABSTRACT

A transformer cooling system is described. The transformer cooling system includes a dry transformer and a housing for the dry transformer. The dry transformer includes a core including a leg. Additionally, the dry transformer includes a winding body arranged around the leg. Further, a cooling channel extending in a direction of a longitudinal axis of the winding body is provided. Additionally, the transformer cooling system includes a heat exchanger adapted to dissipate heat from the housing. Further, the transformer cooling system includes a flow generating device arranged in the housing for providing a cooling flow in the cooling channel. The flow generating device is connected to the heat exchanger.

9 Claims, 6 Drawing Sheets

(58) Field of Classification Search
USPC .................................................... 336/55–62
See application file for complete search history.

(56) References Cited

U.S. PATENT DOCUMENTS

| | | | |
|---|---|---|---|
| 2011/0221554 | A1 | 9/2011 | Schwaiger |
| 2012/0299677 | A1 | 11/2012 | Galletti et al. |
| 2017/0358390 | A1 | 12/2017 | Barrieras et al. |
| 2019/0362879 | A1 | 11/2019 | Tepper et al. |

FOREIGN PATENT DOCUMENTS

| | | | | |
|---|---|---|---|---|
| JP | 62049216 | U | * | 3/1987 |
| JP | H07263247 | A | | 10/1995 |
| JP | 2007173685 | A | * | 7/2007 |
| JP | 2015228442 | A | | 12/2015 |
| KR | 101082872 | B1 | | 11/2011 |
| WO | 2018146196 | A1 | | 8/2018 |

OTHER PUBLICATIONS

International Search Report and Written Opinion of the International Searching Authority, PCT/EP2019/078672, mailed Jan. 28, 2020, 12 pages.
Indian Examination Report dated Sep. 27, 2021 for Indian Patent Application No. 202147023218, 5 pages.

* cited by examiner

TRANSFORMER COOLING SYSTEM AND TRANSFORMER INSTALLATION

CROSS REFERENCE TO RELATED APPLICATIONS

This application is a 35 U.S.C. § 371 national stage application of PCT International Application No. PCT/EP2019/078672 filed on Oct. 22, 2019, which in turns claims foreign priority to European Patent Application No. 18209331.0, filed on Nov. 29, 2018, the disclosures and content of which are incorporated by reference herein in their entirety.

TECHNICAL FIELD

Embodiments of the present disclosure relate to systems for cooling electrical power devices, in particular power transformers. In particular, embodiments of the present disclosure relate to systems for cooling dry transformers, particularly dry type transformers in non-ventilated housings with forced air cooling inside the housing.

BACKGROUND

Various techniques have been proposed to improve the cooling of dry transformers. These include cooling air ducts within the core to improve heat dissipation. Typically, with a fan an overpressure is generated in lower part of the transformer housing, while a lower pressure is created in an upper part of the housing by extracting the air from the upper part. In this way, an air flow is generated which flows from the bottom of the transformer upwards. However, it has been found that a large amount of air does not flow through the cooling ducts within the windings as desired, but flows around the outside of the coils. One reason for this is that the cross-sectional area of the cooling channels within the windings is usually considerably smaller than the cross-sectional area between the housing wall and the coils.

In the state of the art, this problem is addressed by positioning air guide plates in the immediate vicinity of the coils to improve the flow resistance of the area outside the coils to larger than the flow resistance of the cooling channels. However, in order to be sufficiently effective, the air guide plates must be individually adapted to the contours of the coils, which involves a considerable amount of work. Further, due to the fact that the air guide plates also generate considerable additional flow turbulence, the ventilation system operates with a lower overall efficiency.

Accordingly, in view of the above, there is a demand for improved transformer cooling systems which overcome at least some of the problems of the state of the art.

SUMMARY

In light of the above, a transformer cooling system and a transformer installation according to the independent claims are provided. Further aspects, advantages, and features are apparent from the dependent claims, the description, and the accompanying drawings.

According to an aspect of the present disclosure, a transformer cooling system is provided. The transformer cooling system includes a dry transformer. The dry transformer includes a core including a leg. Further, the dry transformer includes a winding body arranged around the leg. A cooling channel extending in a direction of a longitudinal axis of the winding body is provided. The cooling channel is disposed between an inner part of the winding body and an outer part of the winding body. The cooling channel has a first opening provided at a first end of the cooling channel and a second opening provided at a second end of the cooling channel. Additionally, the transformer cooling system includes a housing for the dry transformer. Further, the transformer cooling system includes heat exchanger adapted to dissipate heat from the housing. Moreover, the transformer cooling system includes a flow generating device arranged in the housing for providing a cooling flow in the cooling channel. The wherein the flow generating device is connected to the heat exchanger.

Accordingly, the transformer cooling system of the present disclosure is improved compared to conventional transformer cooling system, particularly with respect cooling efficiency. In particular, by providing a flow generating device being connected to the heat exchanger, has the advantage that the cooled air from the heat exchanger can be directly guided to the flow generating device and then blown into the cooling channel. Thereby, beneficially unnecessary heat exchange between the cooled air and the environment outside the winding body can be avoided. Further, compared to the state of the art, air guidance plates as well as other parts like corresponding support structures, connections, cut-outs etc. can be eliminated. Thus, the transformer cooling system as described herein beneficially provides for a less complex design resulting in a reduction of costs.

According to a further aspect of the present disclosure, a transformer installation is provided. The transformer installation includes a first dry transformer and a second dry transformer. Each of the first dry transformer and a second dry transformer include a core including a leg, a winding body arranged around the leg, and a cooling channel extending in a direction of a longitudinal axis of the winding body. The cooling channel is disposed between an inner part of the winding body and an outer part of the winding body. The cooling channel has a first opening provided at a first end of the cooling channel and a second opening provided at a second end of the cooling channel. Additionally, the transformer installation includes a first housing for the first dry transformer and a second housing for the second dry transformer. Further, the transformer installation includes a cooling apparatus in fluid communication with the first housing and the second housing. The cooling apparatus is adapted to dissipate heat from the first housing and from the second housing. Additionally, a first flow generating device is arranged in the first housing for providing a cooling flow in the cooling channel of the first dry transformer. The first flow generating device is being connected to the cooling apparatus. Moreover, a second flow generating device is arranged in the second housing for providing a cooling flow in the cooling channel of the second dry transformer. The second flow generating device is connected to the cooling apparatus.

Accordingly, the transformer installation of the present disclosure is improved compared to conventional transformer installations, particularly with respect installation size and cooling efficiency. In particular, by providing a cooling apparatus connected to a first flow generating device for cooling a first dry transformer as well as to a second flow generating device for cooling a second dry transformer, a transformer installation with a shared cooling apparatus can be provided resulting in a reduction of the total size of the transformer installation. Further, beneficially the number of cooling apparatuses, e.g. heat exchangers, can be reduced.

Accordingly, the transformer installation as described herein beneficially provides for a less complex design resulting in a reduction of costs.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
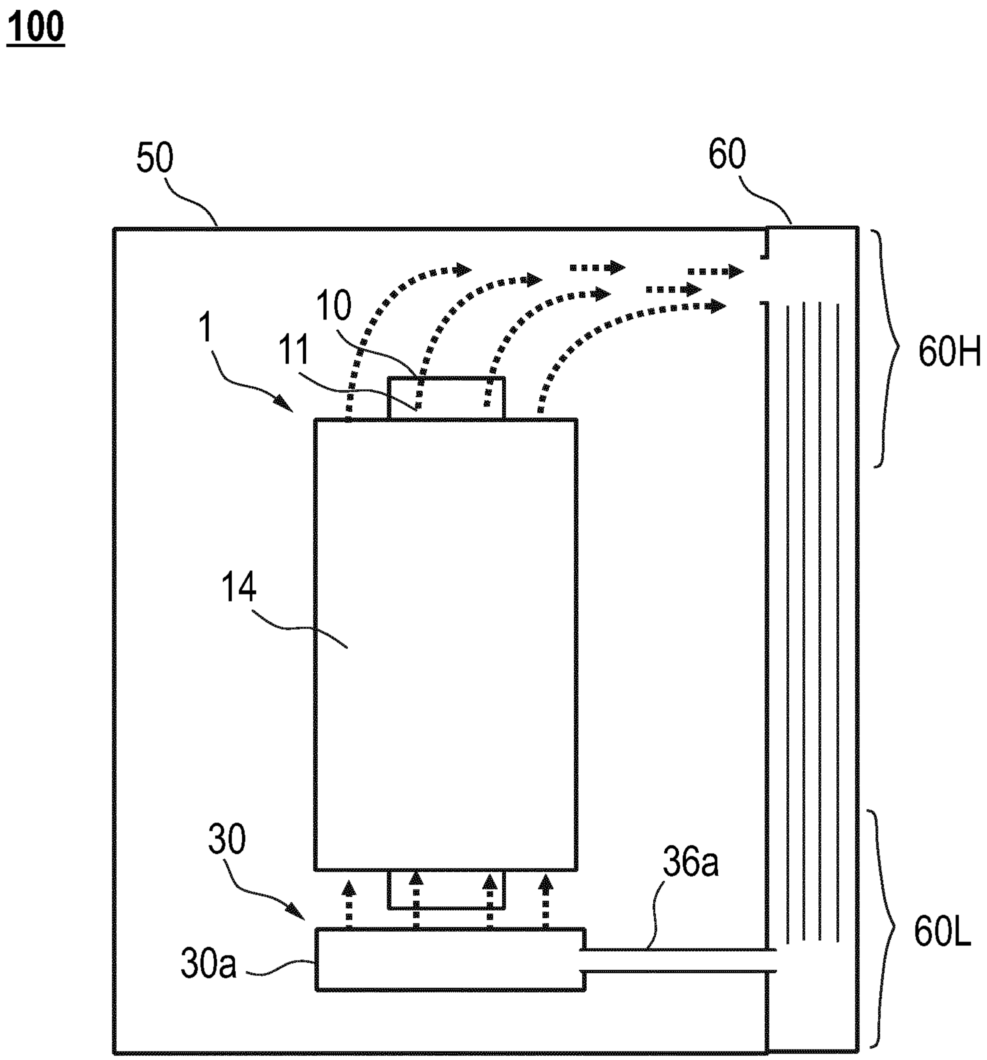
FIG. 1 shows a schematic view of a transformer cooling system according to embodiments described herein.

With exemplary reference to FIG. 1, a transformer cooling system 100 according to the present disclosure is described. According to embodiments which can be combined with any other embodiments described herein, transformer cooling system 100 includes a dry transformer 1. The dry transformer includes a core 10 having a leg 11 as well as a winding body 14 arranged around the leg 11.

Figure 2A:
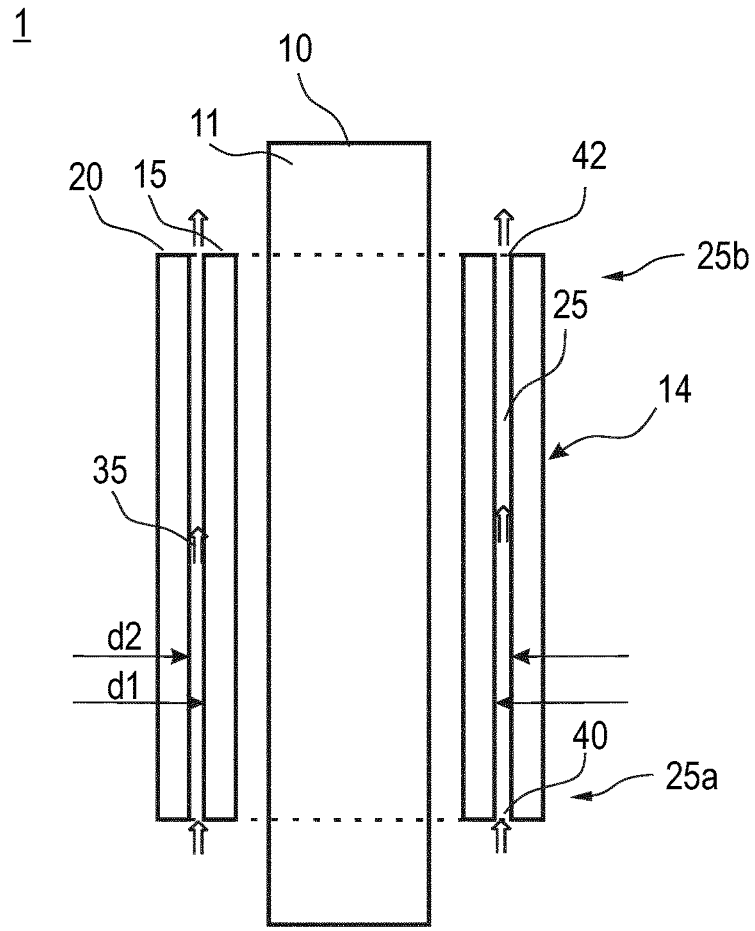
FIG. 2*a* shows a schematic view sectional view of a dry transformer according to embodiments described herein.
Figure 2B:
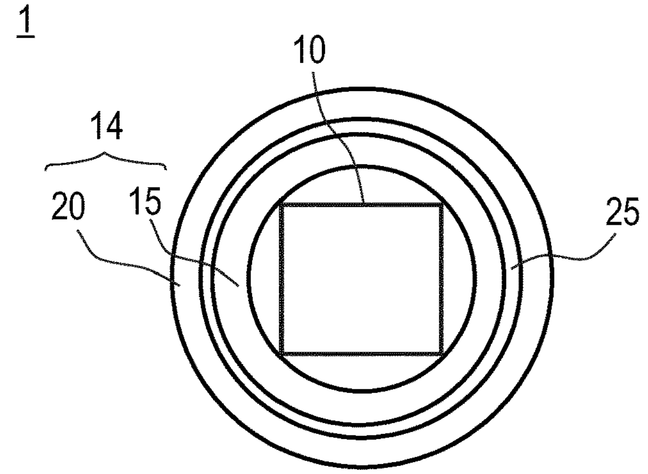
FIG. 2*b* shows a schematic top view of the dry transformer of FIG. 2*a;*

Additionally, as exemplarily shown in FIGS. 2*a* and 2*b*, the dry transformer includes a cooling channel 25 extending in a direction of a longitudinal axis of the winding body 14. The cooling channel 25 is disposed between an inner part 15 of the winding body 14 and an outer part 20 of the winding body 14. Typically, the inner part 15 of the winding body 14 is a low voltage (LV) winding and the outer part 20 of the winding body 14 is a high voltage (HV) winding. Further, the cooling channel 25 has a first opening 40 provided at a first end 25*a* of the cooling channel and a second opening 42 provided at a second end 25*b* of the cooling channel 25. For instance, as shown in FIG. 2*b*, the cooling channel 25 typically—but not necessarily—has an essentially ring-like or annular cross section. For example, as shown in FIG. 2*a*, typically the cooling channel 25 has an internal cooling channel diameter d1 and an external cooling channel diameter d2.

It is to be understood that a transformer including a cooling channel can include one or more cooling channels. Typically, a channel between low voltage (LV) winding and high voltage (HV) is referred to as cooling channel. However, a cooling channel may also refer to other channels provided in the winding body, e.g. within the high voltage (HV) winding and/or within the low voltage (LV) winding.

Further, as exemplarily shown in FIG. 1, the transformer cooling system 100 includes a housing 50 for the dry transformer and a heat exchanger 60 adapted to dissipate heat from the housing 50. Additionally, the transformer cooling system 100 includes a flow generating device 30 arranged in the housing 50. The flow generating device 30 is configured and arranged for providing a cooling flow in the cooling channel 25. Further, as exemplarily shown in FIG. 1, the flow generating device 30 is connected to the heat exchanger 60, particularly via a pipe.

Accordingly, the transformer installation of the present disclosure is improved compared to conventional transformer installations, particularly with respect installation size and cooling efficiency. In particular, by providing a flow generating device being connected to the heat exchanger, has the advantage that the cooled air from the heat exchanger can be directly guided to the flow generating device and then blown into the cooling channel. Thereby, beneficially unnecessary heat exchange between the cooled air and the environment outside the winding body can be avoided. Further, compared to the state of the art, air guidance plates as well as other parts like corresponding support structures, connections, cut-outs etc. can be eliminated. Thus, the transformer cooling system as described herein beneficially provides for a less complex design resulting in a reduction of costs.

With exemplary reference to FIG. 1, according to some embodiments, which can be combined with other embodiments described herein, the flow generating device 30 includes a first flow generating unit 30*a* arranged underneath the dry transformer 1. More specifically, the first flow generating unit 30*a* can be positioned directly under the winding body 14 for providing the cooling airflow into the cooling channels 25. In particular, typically the first flow generating unit 30*a* is connected via a first pipe 36*a* to a low temperature portion 60L of the heat exchanger 60.

Accordingly, beneficially the cooling air from the low temperature portion of the heat exchanger can be blown into the cooling channels, as exemplarily indicated by the arrows depicted at the bottom of FIG. 1. In particular, an air inlet of the first flow generating unit 30*a* can be connected via the first pipe 36*a* with an air outlet provided at the low temperature portion of the heat exchanger, such that first flow generating unit 30*a* can suck the cooling air from the heat exchanger. After having passed the cooling channel the warmed up or heated cooling air typically exits the dry transformer at the top and enters the heat exchanger 60 through an opening provided in a high temperature portion 60H of the heat exchanger 60, as exemplarily indicated by the arrows at the top of FIG. 1.

Figure 3:
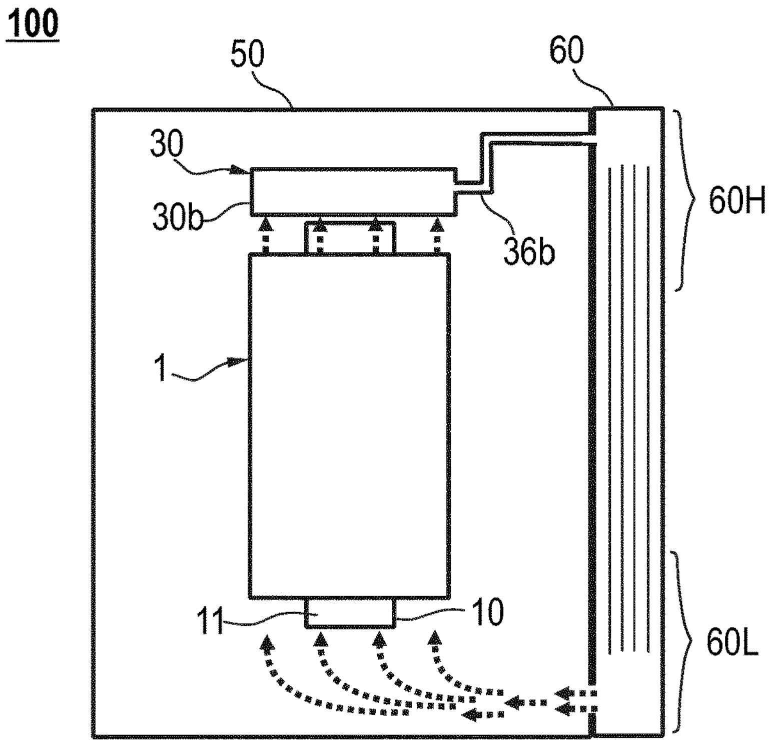
FIG. 3 shows a schematic view of a transformer cooling system according to further embodiments described herein.

Additionally or alternatively, the flow generating device 30 may include a second flow generating unit 30*b* arranged above the dry transformer 1, as exemplarily shown in FIG. 3. For instance, the second flow generating unit 30*b* can be connected via a second pipe 36*b* to a high temperature portion 60H of the heat exchanger 60. Accordingly, the second flow generating unit 30*b* can be configured to suck the cooling air through the cooling channels 25.

It is to be understood that the flow generating device may include only a first flow generating unit 30*a* (as exemplarily shown in FIG. 1), or only a second flow generating unit 30*b* (as exemplarily shown in FIG. 3), or a combination of a first flow generating unit 30*a* and the second flow generating unit 30*b*.

Figure 4:
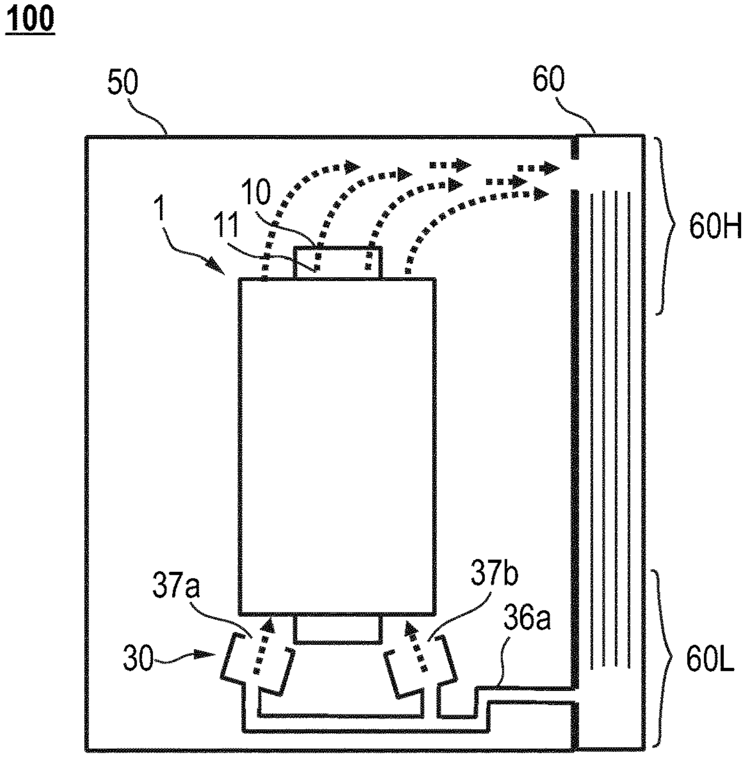
FIG. 4 shows a schematic view of a transformer cooling system according to yet further embodiments described herein.

With exemplary reference to FIG. 4, according to some embodiments, which can be combined with other embodiments described herein, the flow generating device 30 includes a first flow opening 37*a* and a second flow opening 37*b*. In particular, as exemplarily shown in FIG. 4, the first flow opening 37*a* can be arranged on an opposite side of the core 10 of the dry transformer 1 than the second flow opening 37*b*. Further, it is to be understood that the configuration of flow generating device 30 provided underneath the dry transformer as shown in FIG. 4, can also be applied to a configuration in which the flow generating device 30 is provided above the dry transformer 1, as exemplarily shown in FIG. 3.

Figure 5A:
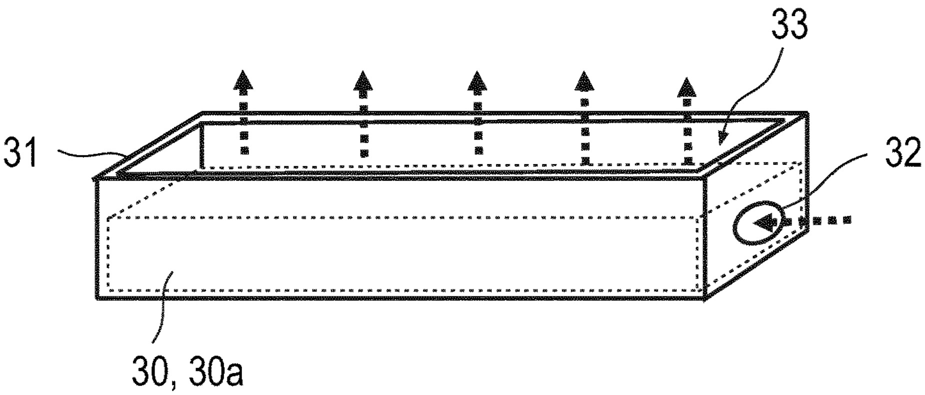
FIGS. 5*a* and 5*b* show exemplary embodiments of a flow guiding device of a transformer cooling system according to embodiments described herein.
Figure 5B:
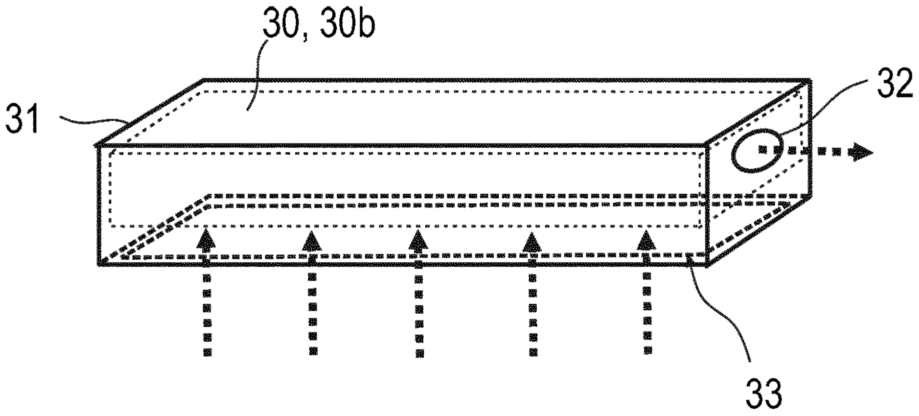

With exemplary reference to FIGS. 5*a* and 5*b*, the transformer cooling system may further include a flow guiding device 31 for guiding the flow generated by the flow generating device 30 to enhance the cooling flow in the cooling channel 25. In particular, the flow guiding device 31 can be an enclosure of the flow generating device 30. Typically, the flow guiding device 31 being configured as enclosure has an opening towards the cooling channel 25.

For instance, for a flow generating device 30 having a first flow generating unit 30*a*, the main opening of flow guiding device 31 is arranged at the top of the flow guiding device in order to guide the cooling air from the bottom into the cooling channels. Further, as exemplarily shown in FIG. 5*a*, typically a connection opening 32 is provided at a side wall of the flow guiding device in order to establish a connection to the heat exchanger, e.g. via first pipe 36*a* as shown in FIG. 1. Accordingly, as shown in FIG. 5*b*, for a flow generating device 30 having a second flow generating unit 30*b* arranged above the dry transformer, the main opening of flow guiding device 31 is arranged at the bottom of the flow guiding device in order to improve the sucking performance of the second flow generating unit 30*b*. In FIGS. 5 and 5*b*, the air flow is indicated by the dotted arrows.

Figure 8:
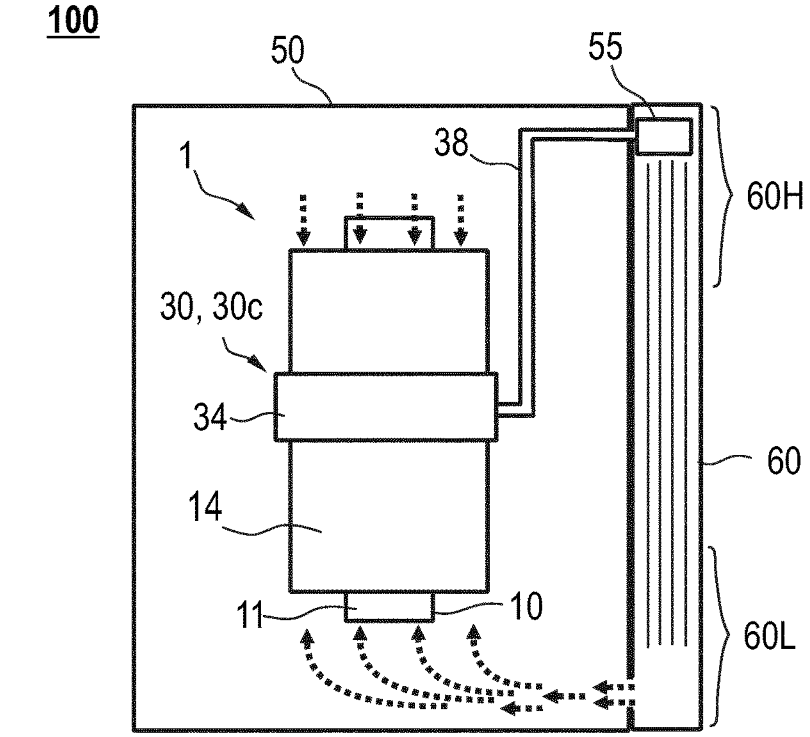
FIG. 8 shows a schematic view of another configuration of a transformer cooling system including a pressure chamber according to further embodiments described herein.
Figure 9:
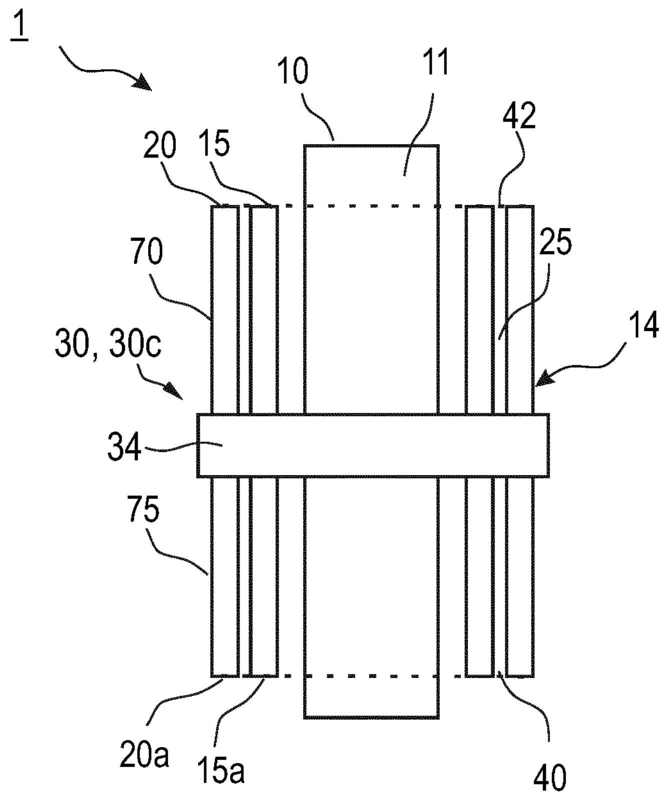
FIG. 9 shows a schematic view of a dry transformer having winding segments according to some embodiments described herein.

With exemplary reference to FIGS. 8 and 9, according to some embodiments, which can be combined with other embodiments described herein, the winding body 14 of the dry transformer 1 may include two winding body segments 70, 75 arranged separately in the longitudinal direction of the leg 11. As exemplarily show in FIG. 9, each winding body segment has an inner part 15, 15*a* and an outer part 20, 20*a*. Further, as can be seen from FIG. 9, segment cooling channels 25*a*, 25*b* are provided between the inner parts 15, 15*a* and an outer parts 20, 20*a* of the winding body segments 70, 75. Such a configuration is beneficial for providing a flow generating unit between the two winding body segments. Accordingly, as exemplarily shown in FIGS. 8 and 9, the flow generating device may include a third flow generating unit 30*c* arranged between the two winding body segments 70, 75.

In the present disclosure, the flow generating device 30 may include at least one element selected from the group consisting of: a fan, a cross-flow fan, a pump, and a pressure chamber 34. In other words, at least one of the flow generating units described herein (i.e. the first flow generating unit 30*a* and/or the second flow generating unit 30*b* and/or the third flow generating unit 30*c*) may be configured as a fan, a cross-flow fan, a pump, or a pressure chamber 34.

Figure 7:
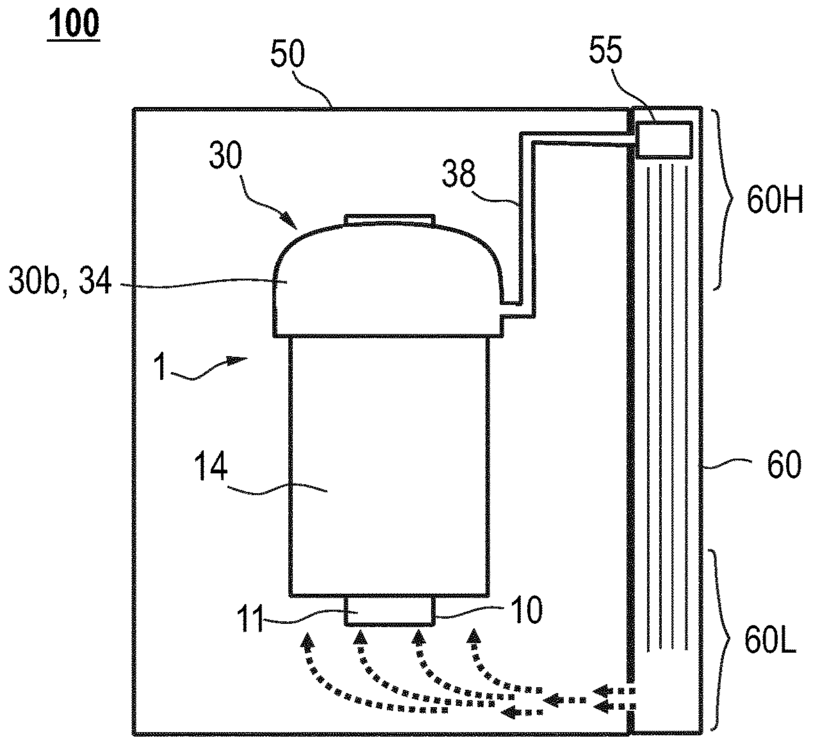
FIG. 7 shows a schematic view of a transformer cooling system according to further embodiments described herein including a pressure chamber.

With exemplary reference to FIG. 7, according to some embodiments, which can be combined with other embodiments described herein, the second flow generating unit 30*b* is a pressure chamber 34 which is provided over a top portion of the dry transformer. In particular, typically the second flow generating unit 30*b* being a pressure chamber 34 is connected to a pump 55 via a connection pipe 38, as shown in FIG. 7.

According to an example, the third flow generating unit 30*c*, as exemplarily shown in FIG. 8, is a pressure chamber 34 which is connected to a pump 55 via a connection pipe 38. As indicated by the dotted arrows in the exemplary embodiment of FIG. 8, the cooling air can be sucked into the cooling channel form the bottom of the dry transformer, e.g. via the first opening 40 (shown in FIG. 9), as well as from the top of the dry transformer, e.g. via the second opening 42 (shown in FIG. 9).

In particular, according to some embodiments which can be combined with other embodiments describe herein, the flow generating device 30 is not a ring-fan, particularly not a bladeless ring-fan.

Figure 6:
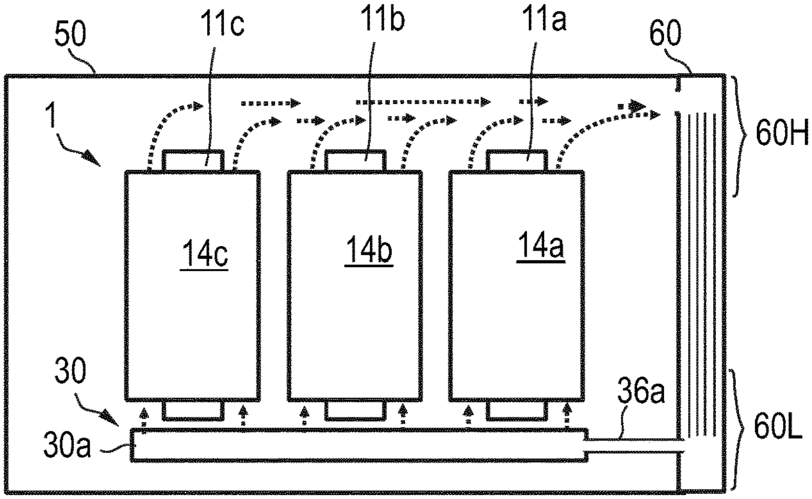
FIG. 6 shows a schematic view of a transformer cooling system for a three-phase dry transformer according to further embodiments described herein.

As exemplarily shown in FIG. 6, according to some embodiments, which can be combined with other embodiments described herein, the dry transformer 1 can be a three-phase transformer including three legs 11*a*, 11*b*, 11*c* and three windings 14*a*, 14*b*, 14*c*. In particular, the three legs 11*a*, 11*b*, 11*c* and the three windings 14*a*, 14*b*, 14*c* can be configured as explained for the dry transformer shown in FIGS. 2*a* and 2*b*.

Figure 10:
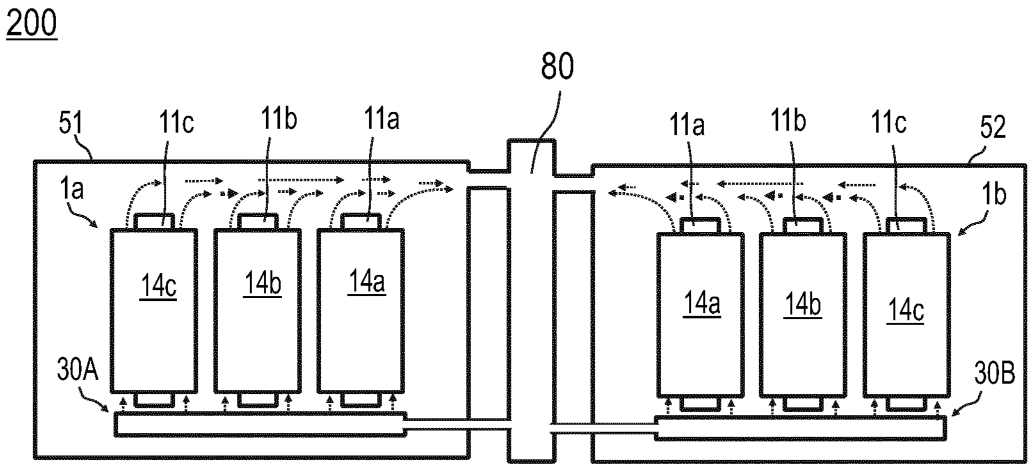
FIG. 10 a transformer installation according to embodiments described herein.

With exemplarily reference to FIG. 10, a transformer installation 200 according to the present disclosure is described. According to embodiments which can be combined with any other embodiments described herein, the transformer installation 200 includes a first dry transformer 1*a* and a second dry transformer 1*b*. Each of the first dry transformer 1*a* and the second dry transformer 1*b*, include a core 10 having a leg 11, a winding body 14 arranged around the leg 11, and a cooling channel 25 extending in a direction of a longitudinal axis of the winding body 14. The cooling channel 25 is disposed between an inner part 15 of the winding body 14 and an outer part 20 of the winding body 14, as exemplarily described with reference to FIG. 2*a*. Further, the cooling channel 25 has a first opening 40 provided at a first end of the cooling channel and a second opening 42 provided at a second end of the cooling channel.

Additionally, as exemplarily shown in FIG. 10, the transformer installation 200 includes a first housing 51 for the first dry transformer 1*a* and a second housing 52 for the second dry transformer 1*b*. Further, the transformer installation 200 includes cooling apparatus 80 in fluid communication with the first housing 51 and with the second housing 52. In particular, the cooling apparatus 80 is adapted to dissipate heat from the first housing 51 and from the second housing 52.

Further, as exemplarily shown in FIG. 10, a first flow generating device 30A is arranged in the first housing 51 for providing a cooling flow in the cooling channel 25 of the first dry transformer 1*a*. The first flow generating device 30A is connected to the cooling apparatus 80, particularly via a pipe. In particular, the first flow generating device 30A can be any flow generating device as described herein, e.g. with reference to FIGS. 1 to 8. In particular, the first flow generating device 30A may include a first flow generating unit 30*a* and/or second flow generating unit 30*b* and/or a third flow generating unit 30*c*, as described herein.

Additionally, a second flow generating device 30B is arranged in the second housing 52 for providing a cooling flow in the cooling channel 25 of the second dry transformer 1*b*. The second flow generating device 30B is connected to the cooling apparatus 80, particularly via a pipe. In particular, the second flow generating device 30B can be any flow generating device as described herein e.g. with reference to FIGS. 1 to 8. In particular, the second flow generating device 30B may include a first flow generating unit 30*a* and/or second flow generating unit 30*b* and/or a third flow generating unit 30*c*, as described herein.

According to some embodiments which can be combined with any other embodiments described herein, the cooling apparatus 80 is a stand-alone heat exchanger or a HVAC (Heating, Ventilation and Air Conditioning) System. In particular, the cooling apparatus 80 can be a heat exchanger as described herein.

Accordingly, embodiment of the transformer installation as described herein beneficially provide for an installation with a shared stand-alone heat exchanger or a HVAC, which can have an advantage for the case in that several same type transformers are placed within a building. The stand-alone heat exchanger provides the required cooling air for all transformers, which are connected to the heat exchanger.

In view of the above, it is to be understood that embodiments of the present disclosure have one or more of the following advantages. Compared to the state of the art, air guidance plates (incl. support structure, connections, cut-outs) can be eliminated. The cooled air can be directly guided to the flow generating device, e.g. a fan, through a pipe and then blown into the cooling channels. This avoids unnecessary heat exchange between the cooled air and the environment outside the coils and keeps the cooled air in tube cool. Most of the cooling air flows through the cooling channels in the coils/windings with a much less effort compared to the state of the art. Further, the flow generating units can be placed inside transformers, e.g. the third flow generating unit 30*c* as described with reference to FIG. 8. Such a configuration has the advantage that the total size of the transformer system can be reduced. Further, it is to be understood that the heat exchanger can be placed in any side of transformer as a stand-alone unit. The installation of transformers with a shared stand-alone heat exchanger reduces the size of transformer system further by reducing the number of heat exchangers required. Similarly, the installation of transformers in connection with HVAC reduces the size of transformer system by reducing the number of heat exchangers required. Further, the installation of transformers in connection with HVAC reduces the production cost of transformer system by removing heat exchangers required.

While the foregoing is directed to embodiments, other and further embodiments may be devised without departing from the basic scope, and the scope is determined by the claims that follow.

REFERENCE NUMBERS

1 dry transformer
10 core
11 legs
11*a*, 11*b*, 11*c* legs of three-phase transformer
14 winding body
14*a*, 14*b*, 14*c* windings of three-phase transformer
15 inner part of winding body
20 outer part of winding body
25 cooling channel
25*a* first end of cooling channel
25*b* second end of cooling channel
30 flow generating device
30A first flow generating device
30B second flow generating device
30*a* first flow generating unit
30*b* second flow generating unit
30*c* third flow generating unit
31 flow guiding device
32 connection opening
33 flow guiding opening
34 pressure chamber
35 annular cooling air flow
36*a* first pipe
36*b* second pipe
37*a* first flow opening
37*b* second flow opening
38 connection pipe
40 first opening
42 second opening
50 housing
55 pump
60 heat exchanger
60L low temperature portion of heat exchanger
60H high temperature portion of heat exchanger
70, 75 winding segments
80 cooling apparatus
d1 internal cooling channel diameter
d2 outer cooling channel diameter

The invention claimed is:

1. A transformer cooling system, comprising:
a dry transformer, comprising:
a core comprising a leg,
a winding body arranged around the leg,
a cooling channel extending in a direction of a longitudinal axis of the winding body, the cooling channel being disposed between an inner part of the winding body and an outer part of the winding body, and the cooling channel having a first opening provided at a first end of the cooling channel and a second opening provided at a second end of the cooling channel,
a flow generating device for providing a cooling flow in the cooling channel, the flow generating device being connected to a heat exchanger,
a flow guiding device for guiding the flow generated by the flow generating device to enhance the cooling flow in the cooling channel, the flow guiding device comprising an enclosure containing the flow generating device, the enclosure having an opening towards the cooling channel,
a housing containing the dry transformer, the flow generating device, and the flow guiding device, and
the heat exchanger adapted to dissipate heat from the housing.

2. The transformer cooling system of claim 1, wherein the flow generating device comprises a first flow generating unit arranged underneath the dry transformer, and wherein the first flow generating unit is connected via a first pipe to a low temperature portion of the heat exchanger.

3. The transformer cooling system of claim 1, wherein the flow generating device comprises a second flow generating unit arranged above the dry transformer, and wherein the second flow generating unit is connected via a second pipe to a high temperature portion of the heat exchanger.

4. The transformer cooling system of claim 1, wherein the flow generating device comprises a first flow opening and a second flow opening, wherein the first flow opening is arranged on an opposite side of the core of the dry transformer than the second flow opening.

5. The transformer cooling system of claim 1, wherein the winding body comprises two winding body segments arranged separately in the longitudinal direction of the leg, each winding body segment having an inner part and an outer part, wherein segment cooling channels are provided there between, and wherein the flow generating device comprises a third flow generating unit is arranged between the two winding body segments.

6. The transformer cooling system of claim 1, wherein the flow generating device includes at least one element selected from the group consisting of: a fan, a cross-flow fan, a pump, and a pressure chamber.

7. The transformer cooling system of claim 1, wherein the dry transformer is a three-phase transformer comprising three legs and three windings.

8. A transformer installation, comprising:

first dry transformer and a second dry transformer, each comprising:

a core comprising a leg, a winding body arranged around the leg, and a cooling channel in a direction of a longitudinal axis of the winding body, the cooling channel being disposed between an inner part of the winding body and an outer part of the winding body, and the cooling channel having a first opening provided at a first end of the cooling channel and a second opening provided at a second end of the cooling channel, a first flow generating device for providing a cooling flow in the cooling channel of the first dry transformer, the first flow generating device being connected to the cooling apparatus, a second flow generating device for providing a cooling flow in the cooling channel of the second dry transformer, the second flow generating device being connected to the cooling apparatus, a first housing containing the first dry transformer and the first flow generating device, a second housing containing the second dry transformer and the second flow generating device, and a cooling apparatus in fluid communication with the first housing and with the second housing, the cooling apparatus being adapted to dissipate heat from the first housing and from the second housing.

9. The transformer installation of claim 8, wherein the cooling apparatus is a stand-alone heat exchanger or a HVAC (Heating, Ventilation and Air Conditioning) System.

* * * * *